A. D. ZIEBARTH AND A. V. MAGNUSON.
DRAWING TABLE FOR MOLDING MACHINES.
APPLICATION FILED APR. 9, 1919.
1,316,261.
Patented Sept. 16, 1919.
3 SHEETS—SHEET 1.
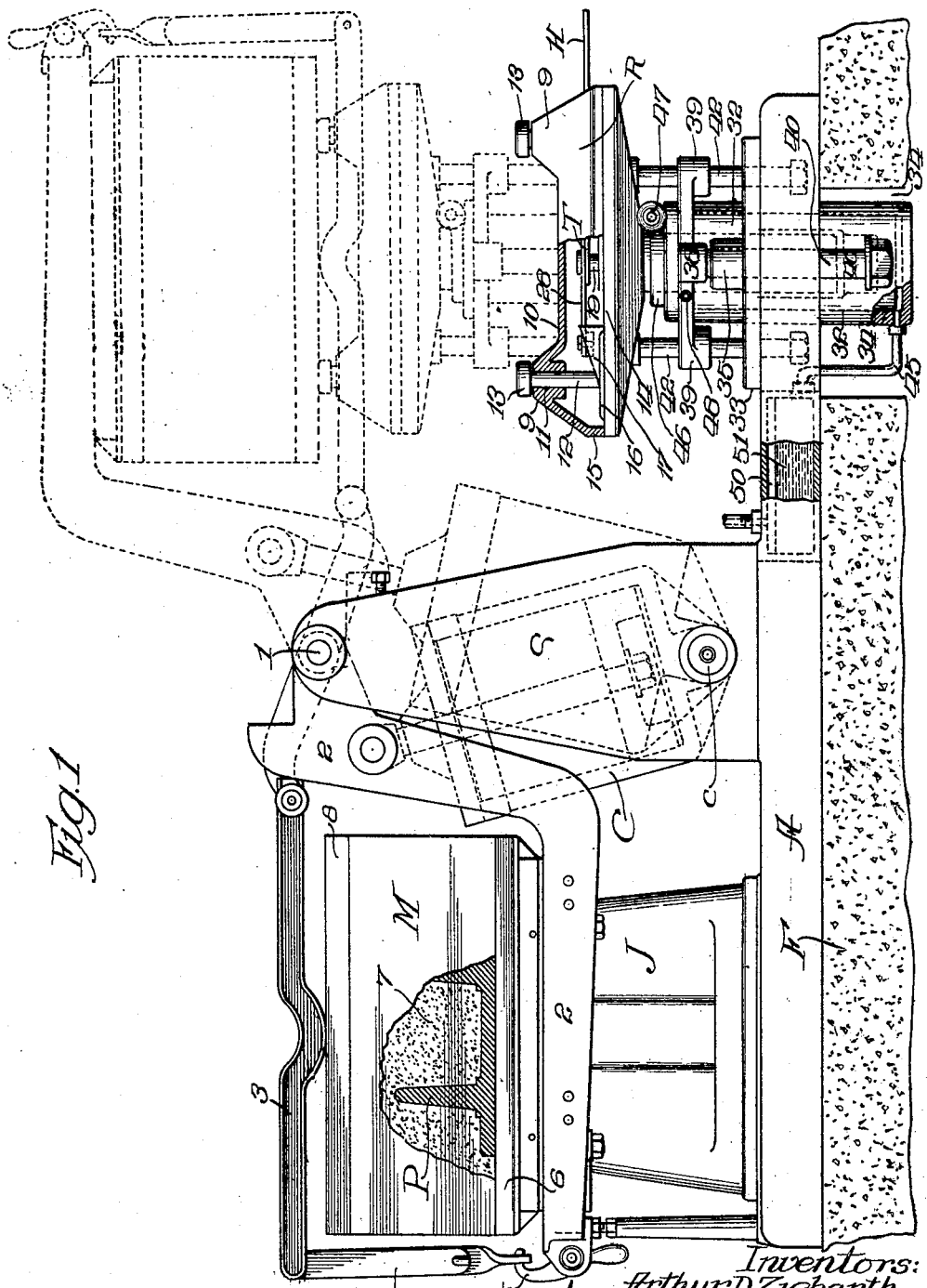

A. D. ZIEBARTH AND A. V. MAGNUSON.
DRAWING TABLE FOR MOLDING MACHINES.
APPLICATION FILED APR. 9, 1919.
1,316,261.
Patented Sept. 16, 1919.
3 SHEETS—SHEET 2.
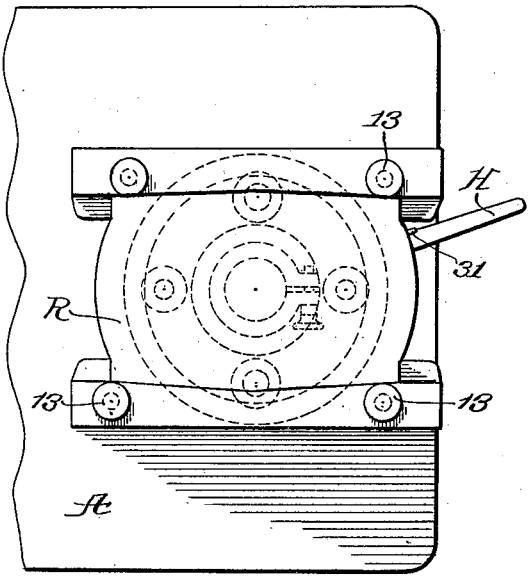
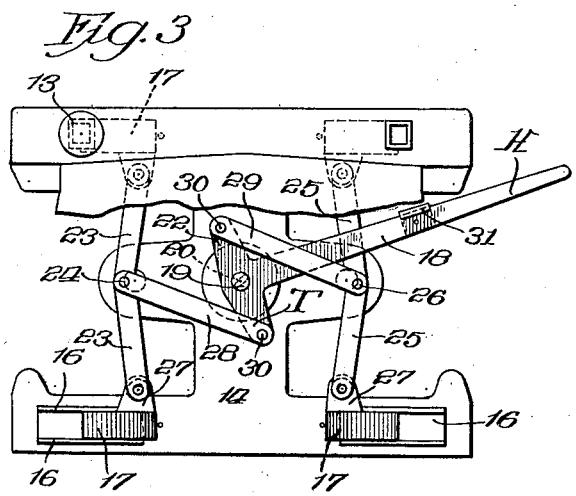 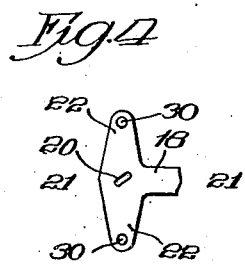
Inventor:
Arthur D. Ziebarth
Alfred V. Magnuson
By their Atty.

A. D. ZIEBARTH AND A. V. MAGNUSON.
DRAWING TABLE FOR MOLDING MACHINES.
APPLICATION FILED APR. 9, 1919.
1,316,261.
Patented Sept. 16, 1919.
3 SHEETS—SHEET 3.
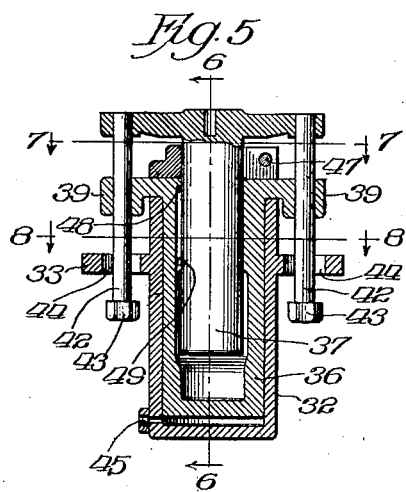
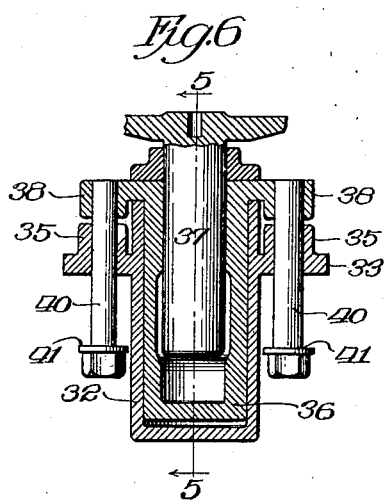
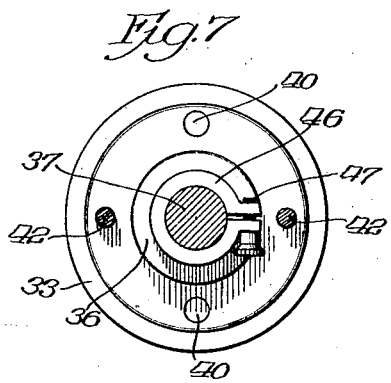
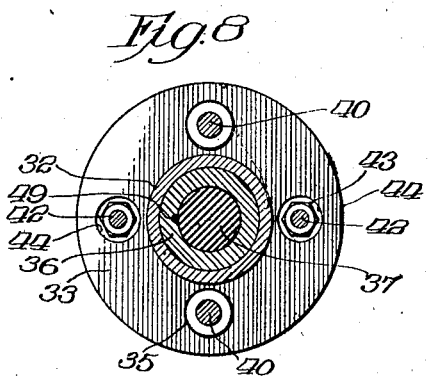
Inventors:
Arthur D. Ziebarth
Alfred V. Magnuson
By
their Atty.

UNITED STATES PATENT OFFICE.

ARTHUR D. ZIEBARTH, OF DAVENPORT, IOWA, AND ALFRED V. MAGNUSON, OF BERWYN, ILLINOIS, ASSIGNORS TO DAVENPORT MACHINE & FOUNDRY COMPANY, OF DAVENPORT, IOWA, A CORPORATION OF IOWA.

DRAWING-TABLE FOR MOLDING-MACHINES.

1,316,261.      Specification of Letters Patent.      Patented Sept. 16, 1919.

Original application filed December 30, 1918, Serial No. 268,887. Divided and this application filed April 9, 1919. Serial No. 288,778.

*To all whom it may concern:*

Be it known that we, ARTHUR D. ZIEBARTH and ALFRED V. MAGNUSON, citizens of the United States, and residents of Davenport, county of Scott, State of Iowa, and of Berwyn, county of Cook, and State of Illinois, respectively, have invented certain new and useful Improvements in Drawing-Tables for Molding-Machines; and we do hereby declare that the following is a full, clear, and exact description thereof, reference being had to the accompanying drawings, and to the letters of reference marked thereon, which form a part of this specification.

This invention relates to pattern drawing mechanism for molding machines, more particularly applicable to that type of roll-over molding machines illustrated in our application, Ser. No. 268,887, filed December 30, 1918, of which this is a divisional application.

The principal object of our present invention is the employment of a movable rest table to receive the mold when brought to its inverted position by the roll-over movement of a molding machine, said table being actuated toward and from the mold by fluid pressure, and being provided with means for effecting a final adjustment between the table and mold preparatory to the "drawing" operation.

Another object is to provide a construction whereby the mold receiving table is mounted upon the moving piston of a fluid pressure cylinder, the latter being in its turn the piston of a second cylinder, means for producing a relative movement between the pistons of the two cylinders whereby a partial adjustment of the table and the mold or flask unit is effected, means for locking the two pistons together after said partial adjustment and means for effecting a final adjustment between the table and the flask unit.

Another object of our invention is to produce a strong and durable device, which will not only be cheaply manufactured, easily manipulated without getting out of order, and efficient in use, and in which the cost of repairs will be negligible.

These and other objects of the invention will be readily understood as we proceed with our specification.

In the form of our invention illustrated in the drawings,—

Figure 1 is a side elevation of a molding machine of the roll-over type to which our improved pattern drawing mechanism has been applied,—parts being shown in section and part in dotted lines to illustrate some parts in different positions in operation.

Fig. 2 is a top plan view of the pattern drawing mechanism.

Fig. 3 is also a top plan view of the same, with parts broken away to illustrate in plan view the toggle-link mechanism.

Fig. 4 is a plan view of a part of the toggle opearting arm.

Fig. 5 is a central, longitudinal, sectional view of the cylinders, somewhat enlarged, taken upon the vertical plane indicated by the dotted line 5—5 of Fig. 6.

Fig. 6 is a central, longitudinal, sectional view of the cylinders, somewhat enlarged, taken upon the vertical plane indicated by the dotted line 6—6 of Fig. 5.

Fig. 7 is a top plan and sectional view, the section being taken on the horizontal plane indicated by the dotted line 7—7 on Fig. 5.

Fig. 8 is a similar view taken on the plane of the dotted line 8—8 of Fig. 5.

In said drawings, A is the base of a molding machine, supported upon a concrete or other foundation F, upon which base are mounted standards S, a jolting table J and a flask receiving table R. Pivoted to the standard S at 1, is a roll-over arm 2, to which a flask or mold unit M is secured by any suitable means, such as link arms 3, 4, and a hook 5. The pattern P to be molded, it will be understood, is suitably secured to a pattern board 6, which in turn is secured to the roll-over arm 2, and after the sand, indicated at 7, has been filled into the mold M and properly tamped by the jolt table unit J, or otherwise, a bottom board 8 is placed on the top of the sand and flask M and the link arms 3, 4, adjusted to lock the mold M and arm 2 together.

Any suitable means may be employed for the roll-over operation, but I prefer to use pressure fluid in a cylinder C upon a rock shaft c, pivotally mounted in the standard S, and operating to push the arm 2 and its load from the initial position shown to the flask inverted position illustrated by dotted lines in Fig. 1.

Such mechanism forms the subject of our pending application above mentioned, to which reference is hereby made, and will not be further described in detail herein.

When the mold flask M is brought to the inverted position and before the links 3, 4 whereby it is locked to the arm 2 during the roll-over operation, are released, the table R is brought to its uppermost position and supporting blocks carried thereon are extended upwardly from the table to engage and support the flask M. After the locking link arms 3, 4, are released, the table R is lowered and the flask M carrying the molded sand will separate from the pattern P in a familiar "drop-mold" operation. We will now proceed to describe the means whereby this operation is accomplished.

The table R is, in plan view as shown, substantially rectangular and is provided at what may be designated at its four corners, with apertured bosses 9, 9, rising upwardly from the top surface 10, the apertures serving as guide bearings 11 for the stems 12 of contact or supporting blocks 13. The interior of the table R is hollow, the upper wall surface 10 being supported above the lower wall 14 by side walls 15. Suitable guide ways 16, 16, are placed on the wall 14 for sliding wedges 17, 17,—one under each stem 12, the lower ends of the stems being suitably shaped (preferably tapered as shown) to coöperate with wedges when the latter are actuated, whereby the stems 12 and the blocks 13 may be moved upwardly through their respective bosses 9.

A toggle unit designated as a whole by the letter T may operate the wedges 17 simultaneously by means of a single handle H, which projects through a suitable aperture in one of the side walls 15. Manifestly, however, the wedges may be actuated individually or in pairs, if so desired. The toggle unit T, illustrated, comprises an operating lever 18 provided with the handle H mounted upon a supporting pivotal stud 19 rising from the lower wall 14. The lever 18 is provided with an elongated aperture 20, through which the stud 19 is passed, the side walls of which aperture are parallel and of a distance apart, equal to the diameter of the stud. The aperture 20, it will be observed, is so made that its major axis will be at an angle with the longitudinal, median axis or dimension line 21 of the lever 18, as indicated clearly in Fig. 4. The lever 18 is provided with a pair of laterally projecting arms 22, one on each side of the aperture 20.

The wedges 17 are preferably arranged with their guide-ways 16 in pairs, so that the two wedges on the same side of the machine may be coupled together by toggle-links. As shown, the links 23, 23 are hingedly secured together at 24 and their respective ends are pivotally secured, one to each of the wedges 17 on one side of the table R. Similarly, toggle-links 25, 25 hingedly connected at 26, are secured to the other pair of wedges 17. The wedges 17 may each be provided with an inwardly extending pivot bearing lug 27 whereby they may be connected with these toggle-link ends, but any other means for securing these parts operatively together, may, manifestly, be employed.

A link member 28 connects the lever 18 with the toggle links 23, 23, a second link member 29 connecting the lever 18 with the toggle links 25, 25. The members 28 and 29 being pivotally connected at one of their ends 30 to the lever arms 22, 22, and at their other ends, being connected at 24 and 26 to the toggle links 23, 23, and 25, 25, respectively. Any ordinary means for frictionally holding the lever 18 in any desired position may be employed, as for instance, a flat spring or resilient plate 31 on the lever 18 bearing frictionally against the under surface of the top wall 10 of the table R.

From the foregoing, it will be understood that when the operator moves the lever handle H in one direction, the toggle unit T will cause all of the wedges 17 to move simultaneously outwardly, thereby raising the stems 12 simultaneously; while a movement of the lever handle H in the opposite direction, will cause the simultaneous withdrawal of the wedges 17 from beneath the stems 12. It will also be understood that any inequality in the distance the stems 12 may travel, due for instance to unevenness in the surface of the flask mold M against which the stem-bearing, supporting blocks 13 contact, will be compensated for by the angularly arranged slot or pivotal aperture 20, which permits not only of a pivotal movement of the lever 18 about the stud 19 but also of the necessary (in that event) shifting or bodily movement of the lever upon said stud and in the direction of the length of the aperture or slot 20. Thus all of the suporting blocks 13 will be caused to contact equally with the under side of the flask mold M and maintain an even support for the latter in the separating movement between the pattern and flask.

In practice, when the table R is raised to the inverted and rolled-over flask mold M, the bearing blocks will be usually found to be in substantial contact with the flask, but the final and nicety of adjustment between the flask bottom and the table R will be accomplished by the toggle unit T and the blocks 13; and this latter is of practical importance because of variations in thickness and other irregularities encountered in the various flasks or bottom boards that may be used.

The mounting of the table R and the means for raising and lowering it will now be described.

An operating cylinder and an auxiliary cylinder are used, one within the other, the table R being directly mounted upon the piston of the inner or auxiliary cylinder. Relative movement between the pistons of the two cylinders is provided and means are also provided for locking the piston of the inner or auxiliary cylinder to the piston of the main or outer cylinder. Thus a wide range of movement is afforded to accommodate flasks of a wide variety of thickness or depth as will presently be understood.

The main or outer cylinder 32 is provided with a laterally extending flange 33 by which it is supported upon and may be secured to the machine base A, projecting through a suitable aperture therein so as to extend into the space 34 in the concrete or other foundation F. This cylinder is also provided with two diametrically disposed, upwardly extending and vertically apertured bosses 35, 35 upon the flange 33. The cylinder 32 is closed or headed at its lower end as shown but open at its upper end, and is provided with a piston 36.

The piston 36 is longitudinally recessed from its upper end and thus is a cup-shaped piston-cylinder which we have herein chosen to designate as the auxiliary cylinder when provided as shown, with a piston 37. The table R is suitably secured to the upper extended end of the piston 37. It will be understood that when referring to the cylinder 32, the part marked 36 will be referred to as its piston, and when reference is made to the auxiliary cylinder, the part 36 and its piston 37 will be understood, since the part 36 serves the double purpose of functioning both as a piston for the cylinder 32 and as a cylinder for the piston 37.

The upper part of the cylinder piston 36 is provided with four outwardly extending, equally spaced apertured lugs 38, 38, and 39, 39. The lugs 38, 38 are diametrically opposite each other and so positioned as that the apertures therein shall be in axial alinement with the axis of the apertures of the bosses 35, 35.

Guide bolts 40 are secured at their upper ends in the apertured lugs 38, 38, and depend downwardly through the apertures in the bosses 35, 35, and are provided with bolt heads or shoulders 41 upon their lower ends. The apertured bosses 35, 35 thus act as guides for these bolts 40 when the piston 36 to which they are thus secured is moved within the cylinder 32, the contact of the heads 41 against the lower surface of the flange 33 serving to limit the extent of the upward sliding movement of the bolts through the bosses, and also limit the upward movement of the piston 36 in the cylinder 32.

The lugs 39, 39, on the piston 36 are also diametrically opposite each other, but are located intermediate the lugs 38, 38. These lugs 39, 39, act as guides for guide bolts 42, 42, which latter are secured to and depend downwardly from the lower part of the table R, said bolts 42 being each provided with a shouldered head 43. When there is relative movement of the table R and the piston 37 with respect to the auxiliary cylinder, the extent of this movement will be limited by the contact of the shouldered heads 43 with the under surface of the lugs 39, 39, it being understood, also, that the flange 33 is suitably apertured at 44, 44, to permit of the free passage therethrough of the shouldered heads 43, if desired.

Fluid from any suitable source of supply, as for example, from the conduit 45, may be admitted to the cylinder 32 below the piston 36 to actuate the latter and all parts carried thereby. When the limit of movement is reached by contact of the bolt heads 41, 41, with the fixed flange 33, and a further upward movement is desired, fluid pressure is similarly directed to the interior of the auxiliary cylinder 36 below its piston 37, and the table R carried by the piston 37 will be further raised as desired. When the limit of vertical movement of the piston 37 has been reached by reason of the contact of the shouldered heads 43, 43, contacting with the now stationary lugs 39, 39, and a further movement is desired, the toggle unit T is brought into action by the handle H, to actuate the adjusting blocks 13.

When any considerable number of flasks M, known to be of substantially the same height, are to be used, we find it unnecessary to use all three of the movements, just described, with each flask. Having used these once, we find it convenient to secure the piston 37 in its desired, extended position with reference to the cylinder piston 36, and thereafter with each successive flask we simply move the piston 36 on its cylinder 32 and make the final adjustment with the toggle unit T. This saves a valuable amount of time. The securing or locking of the pistons 36 and 37 together may be accomplished by any suitable means, but we prefer to use a split collar 46 about the piston 37 fastened by screw bolt 47 with the lower edge of the collar resting upon the top of the piston cylinder 36, thereby supporting the table R in the desired extended position with reference to said cylinder and locking the piston 37 against any receding movement.

It will be observed that proper inlet and outlet ports 48, 49, are provided in the auxiliary cylinder 36 for actuating the piston 37, such ports being operatively connected with any suitable source of pressure supply, not illustrated, but readily understood.

Between the conduit 45 and the source of pressure supply, we recommend the use of a suitable buffer in the shape of an enlargement of the conduit proper into a chamber 50 which should be filled almost to capacity with oil 51, the fluid pressure supply being admitted on top of the volume of oil. Such a chamber 50 may be conveniently located or cast into the base A of the machine. The utility of this oil buffer arrangement, effecting as it does smoothness of operation and other advantages, is obvious.

The flask supporting and pattern drawing table hereinabove described is simple and effective in operation, and possesses great utility. Manifestly, changes in the details of construction may be made without departing from our invention or the principles thereof. While the form illustrated and described is recommended as a preferred construction, we do not desire to be limited to the details of construction shown, except as set forth in the appended claims.

We claim as our invention:

1. In a machine of the drop mold, roll-over type, a receiving table for the flask unit in its inverted position, a fluid pressure cylinder for raising said receiving table to receive the flask, adjustable blocks on said receiving table, movable wedges on said table beneath said adjusting blocks and a toggle unit adapted to simultaneously actuate said wedges.

2. In a machine of the roll-over, drop mold type, comprising a receiving table for the flask when inverted, an actuating cylinder, a piston therein operatively connected with said receiving table, adjustable bosses on said table each provided with a sliding stem or bolt, a wedge member under each bolt, guideways on the receiving table for said wedge members and a toggle unit adapted to operatively actuate each of said wedge members.

3. In a molding machine of the roll-over, drop mold type comprising a fluid pressure cylinder, a piston therein, a cylinder within said piston, a piston within said second cylinder, a mold receiving table operatively connected to said second piston, means for supplying fluid pressure to each of said cylinders independently of the other, contact bosses vertically movable in said table and means for adjusting said bosses.

4. A molding machine of the roll-over, drop mold type, comprising a receiving table for the flask when inverted, an actuating cylinder, a piston in said cylinder, means connecting said table to said pistons, means for actuating the piston in said cylinder to cause a vertical movement of the receiving table, vertically movable bosses on the receiving table for taking up the space between said table and the inverted flask when the table is at the limit of its upward movement, and means carried by the movable part of the cylinder to limit the upward movement of the piston thereof.

5. A molding machine of the roll-over, drop mold type, comprising a fluid pressure cylinder and a piston therein, means for operating said piston, said piston constituting also a cylinder for a second piston, a flask receiving table operatively connected with said second piston, means for effecting relative movement between the second piston and the first piston, to effect a partial adjustment, means for locking the two pistons together after said partial adjustment has been effected, and means on the flask receiving table including vertically movable bosses, for effecting a final adjustment between said table and the flask unit.

6. A molding machine of the roll-over, drop mold type, comprising a fluid pressure cylinder and a piston therein, means for operating said piston, said piston constituting also a cylinder for a second piston, a flask receiving table operatively connected with said second piston, means for effecting relative movement between the second piston and the first piston, to effect a partial adjustment, means for locking the two pistons together after said partial adjustment has been effected, and means on the flask receiving table for effecting a final adjustment between said table and the flask unit, said final adjusting means embracing vertically movable blocks, slidable wedges underneath said blocks and a toggle unit for simultaneously actuating said wedges.

7. A machine of the roll-over, drop mold type comprising a hollow receiving table for the flask when inverted, adjustable blocks projecting through and vertically movable on the top of said table, a wedge within said table, one under each block, toggle links uniting said wedges in pairs, an operating lever pivotally mounted in said hollow receiving table with its handle projecting on the inside thereof and links connecting said lever with said toggle links whereby said wedges are moved simultaneously beneath the adjustable blocks.

8. A machine of the roll-over, drop mold type, comprising a hollow receiving table for the flask when inverted, adjustable blocks projecting through and vertically movable in the top of said table, a wedge within said table, one under each block, toggle links uniting said wedges in pairs, an operating lever pivotally mounted in said hollow receiving table with its handle projecting on the inside thereof and links connecting said lever with said toggle links whereby said wedges are moved beneath the adjustable blocks.

9. A machine of the roll-over, drop mold type comprising a hollow receiving table for the flask when inverted, adjustable blocks projecting through and vertically movable in the top of said table, a wedge within said table, one under each block, toggle links uniting said wedges in pairs, an operating lever pivotally mounted in said hollow receiving table with its handle projecting on the inside thereof and links connecting said lever with said toggle links whereby said wedges are moved independently beneath the adjustable blocks.

10. A molding machine of the roll-over, drop mold type, comprising a fluid pressure cylinder and a piston therein, means for operating said piston, said piston constituting also a cylinder for a second piston, a flask receiving table operatively connected with said second piston, means for effecting relative movement between the second piston and the first piston, to effect a partial adjustment, means for locking the two pistons together after said partial adjustment has been effected, and means on the flask receiving table for effecting a final adjustment between said table and the flask unit, said final adjusting means embracing vertically movable blocks, slidable wedges underneath said blocks and a toggle unit for independently actuating said wedges.

In testimony that we claim the foregoing as our invention and affix our signatures in the presence of two witnesses, this 5th day of April, A. D. 1919.

ARTHUR D. ZIEBARTH.
ALFRED V. MAGNUSON.

Witnesses:
EDWARD W. WHITAKER,
OTTO KINNEMANN.

Copies of this patent may be obtained for five cents each, by addressing the "Commissioner of Patents, Washington, D. C."